United States Patent [19]

Nakagome et al.

[11] 4,212,035
[45] Jul. 8, 1980

[54] FACSIMILE SIGNAL CODING SYSTEM

[75] Inventors: Yukio Nakagome, Yokohama; Hiroichi Teramura, Tokyo; Yasuhiro Yamazaki, Hiratsuka; Yasushi Wakahara, Tokyo, all of Japan

[73] Assignee: Kokusai Denshin Denwa Kabushiki Kaisha, Japan

[21] Appl. No.: 913,038

[22] Filed: Jun. 7, 1978

[30] Foreign Application Priority Data

Jun. 16, 1977 [JP] Japan .................................. 52-70438

[51] Int. Cl.$^2$ .............................................. H04N 7/12
[52] U.S. Cl. ..................................... 358/260; 358/261
[58] Field of Search ............... 358/133, 135, 136, 260, 358/261, 263

[56] References Cited

U.S. PATENT DOCUMENTS 3,757,036 9/1973 Libbet et al. .......................... 358/263
3,849,592 11/1974 Rosenheck ........................... 358/260
3,937,871 2/1976 Robinson .............................. 358/260
4,134,133 1/1979 Teramura et al. ................... 358/260

Primary Examiner—Benedict V. Safourek
Assistant Examiner—Joseph A. Orsino, Jr.
Attorney, Agent, or Firm—Robert E. Burns; Emmanuel J. Lobato; Bruce L. Adams

[57] ABSTRACT

A facsimile signal coding system, in which a facsimile signal is divided into a plurality of scanning line groups each including a predetermined number of scanning lines. A substantially central one of the scanning lines of each group is encoded by a coding method without referring to information of a scanning line adjacent to the central scanning line. Information of the remaining lines above the central scanning line is sequentially encoded upwardly from the central scanning line using information of the just precedently encoded line as reference information. Information of the remaining lines below the central scanning line is sequentially encoded downwardly from the central scanning line using information of the just precedently encoded line as reference information.

3 Claims, 11 Drawing Figures

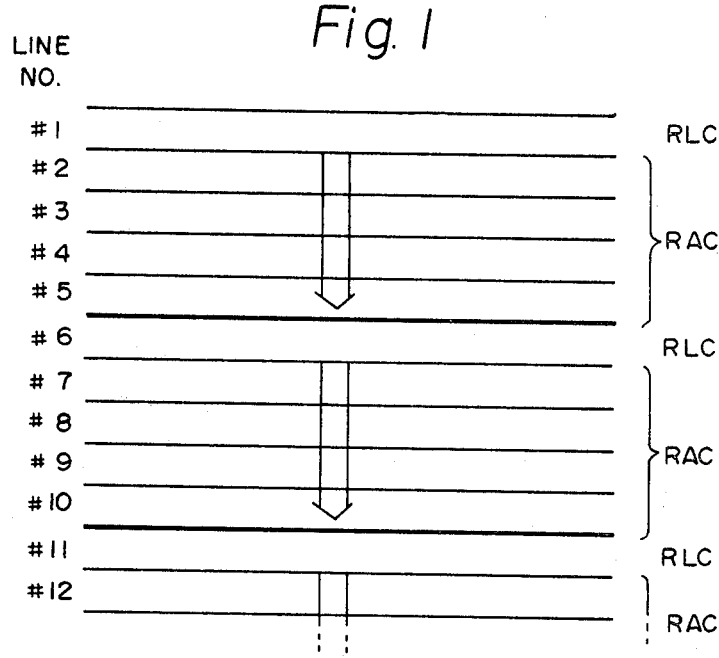
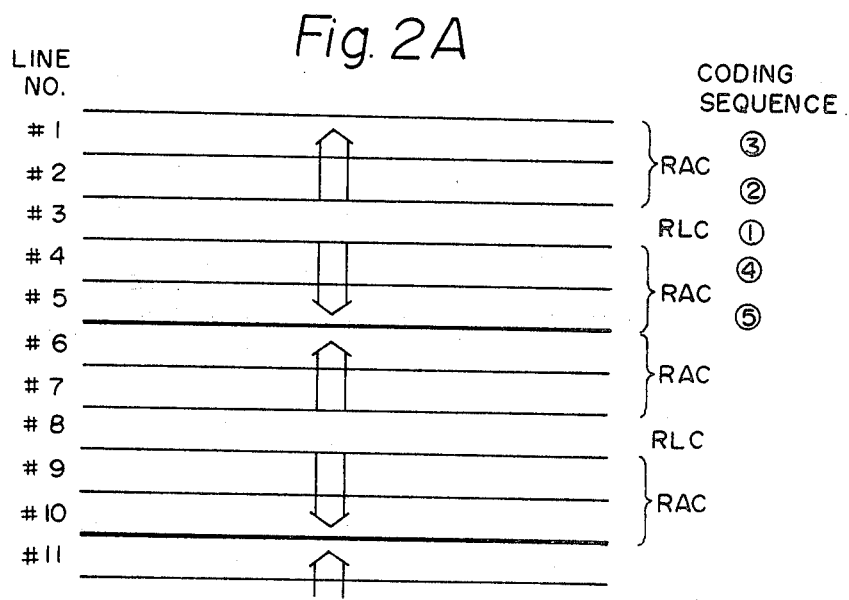

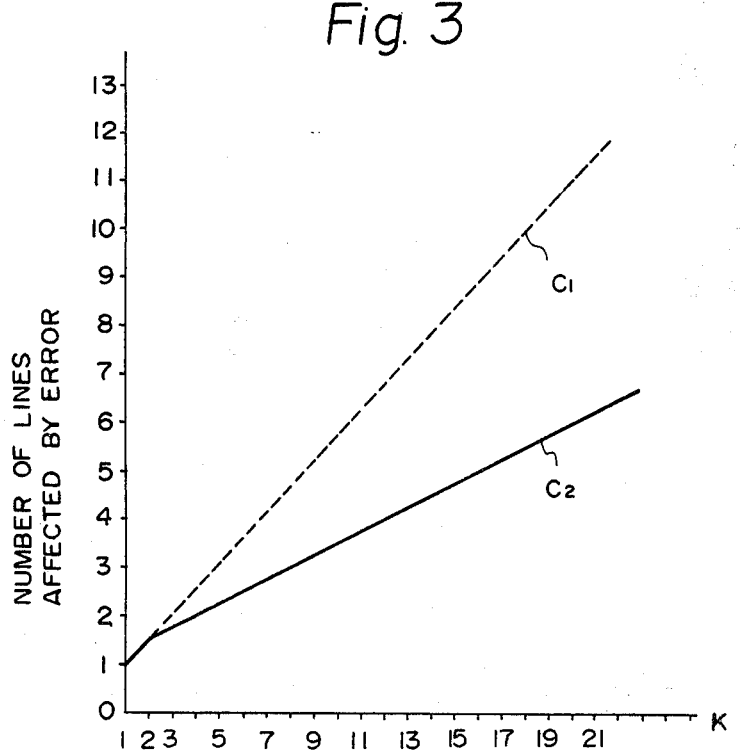

Fig. 4A
| LINE NO. | LINE NO. OF REFERENCE LINE | TYPE OF CODING |
|---|---|---|
| #3 | — | RLC |
| #2 | #3 | RAC |
| #1 | #2 | RAC |
| #4 | #3 | RAC |
| #5 | #4 | RAC |
Fig. 4B
| LINE NO. | LINE NO. OF REFERENCE LINE | TYPE OF CODING |
|---|---|---|
| #2 | — | RLC |
| #1 | #2 | RAC |
| #3 | #2 | RAC |
| #4 | #3 | RAC |
Fig. 5
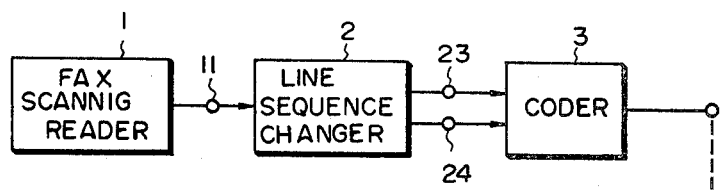
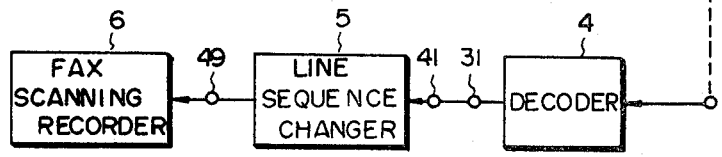

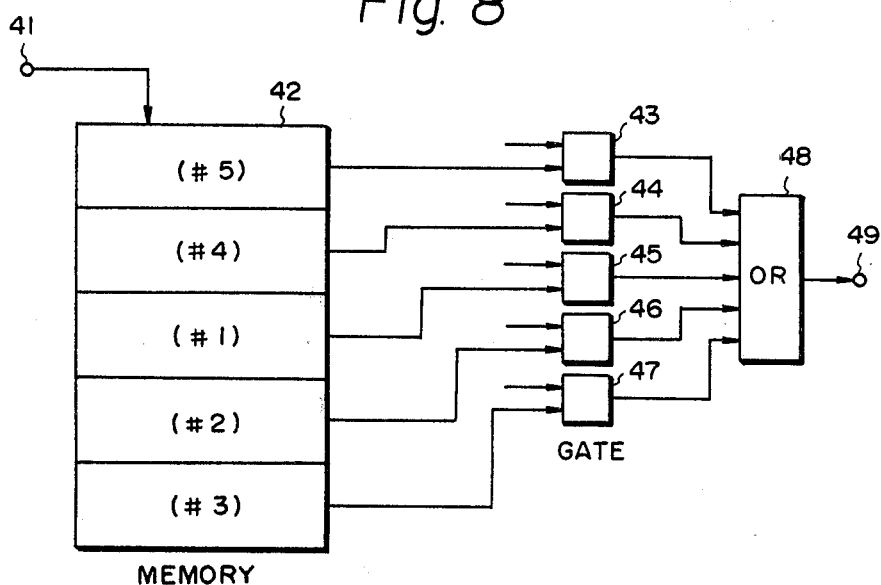

FACSIMILE SIGNAL CODING SYSTEM

This invention relates to a facsimile signal coding system for efficiently encoding a facsimile signal having high correlation in two dimensions to provide for the reduced transmission time.

Heretofore a variety of facsimile signal coding systems have been employed and, among them, a system which encodes information of each scanning line using information of the immediately preceding scanning line as reference information (for example, Japanese patent Disclosure No. 30418/76 "Information Change Picture Element Address Encoding System" (hereinafter referred to as the RAC system) has been proposed as a system having a large reduction effect. With this system, since the information of the immediately preceding scanning line is used as reference information for encoding information of each scanning line, the reduction effect is large but, when an error occurs, for instance, on the transmission line, the error may exert a far-reaching influence on the encoding to degrade the received picture quality. To restrict the influence of the error within certain limits, use has been made of, for example, the run-length coding method which encodes information of scanning lines every predetermined number of them without using information of the immediately preceding scanning lines as reference information. However, when merely encoding the information of scanning lines every predetermined number of them, for instance, by the run-length coding method, the encoded information of scanning lines are smaller in reduction effect than the other scanning lines encoded on the basis of the information of the scanning lines immediately preceding them and the overall reduction effect is small.

An object of this invention is to provide a facsimile signal coding system which gets over the abovesaid defects of the conventional coding systems, restricts the influence of an error on the transmission line within certain limits through the use of a memory of a relatively small storage capacity and a simple device and produces a large reduction effect.

The invention will be described with reference to the accompanying drawings, in which:

FIG. 1 is a scanning line diagram explanatory of a conventional system;

FIGS. 2A and 2B are scanning line diagrams explanatory of the principles of the present invention;

FIG. 3 is a characteristic diagram showing qualitatively the effect of this invention;

FIGS. 4A and 4B are diagrams showing examples of the coding order and the coding methods;

FIG. 5 is a block diagram illustrating an embodiment of this invention;

FIGS. 6, 7 and 8 are block diagram showing specific operative examples of circuits for use in the embodiment of FIG. 5; and FIG. 9 is a scanning line diagram explanatory of another embodiment of this invention.

Figure 6:
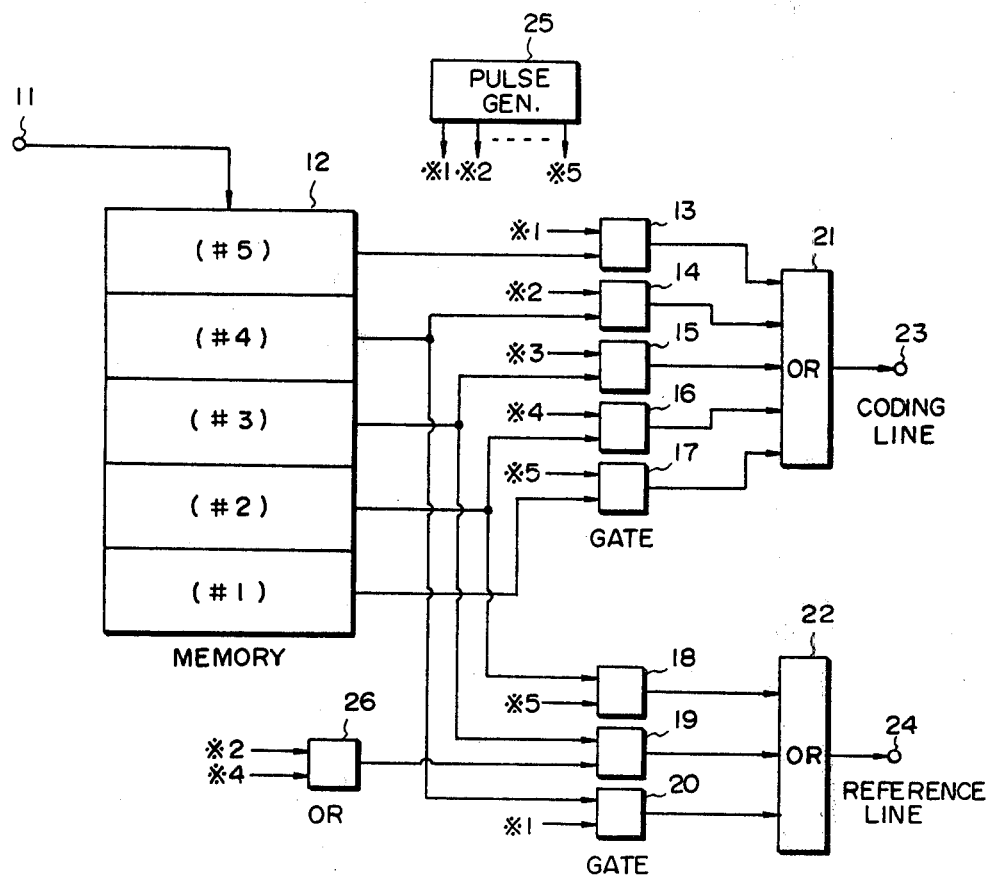

Before entering into a description of the principles of this invention, a system heretofore proposed will be described first with reference to FIG. 1. FIG. 1 shows scanning lines, the number on the left-hand side indicate the scanning line numbers and the characters on the right-hand side the coding methods for the respective scanning lines. In this conventional system, as mentioned above, every predetermined kth lines (k=5 in FIG. 1) are encoded, for example, the run-length coding method (hereinafter referred to as the RLC method) and the other remaining scanning lines are encoded, for instance, by the information change picture element address coding method (hereinafter referred to as the RAC method) which encodes information of each scanning line using information of the immediately preceding scanning lines as reference information. That is, every fifth scanning lines 1, 6 and 11 are encoded by the RLC method and the other scanning lines 2 through 5, 7 through 10, ... are encoded by the RAC method. In this conventional system, assuming that an error on the transmission line occurs totally at random on the facsimile signal of the k scanning lines and that synchronizing information is inserted in the information of each scanning line, when the error occurs, for example, on the ith one of the k scanning lines, the (i+1)th, (i+2)th, ... and the kth scanning lines are all affected by the error. In this prior art system, an expected value S of the number of scanning lines which would be subject to the influence of the error is given as follows:

$$S = (k+1)/2$$

Next, in this invention, as shown in FIGS. 2A and 2B, every kth scanning lines are also encoded by the coding method which does not refer to the information of the immediately preceding scanning lines, for instance, by the RLC method and the other scanning lines are encoded by a coding method which utilizes the information of an adjacent scanning lines as reference information, for example, the RAC method. In this case, however, half the number of scanning lines (or half ± 1) encoded by the RAC method are encoded with the immediately preceding scanning lines referred to, respectively, and the other half (or half ± 1) encoded with the immediately following scanning lines referred to, respectively.

That is, in a case of k=5 (an odd number), as shown in FIG. 2A, the scanning #3, #8, #13, ... are encoded by the RLC method and the scanning lines #2, #4, #7, #9, #12 and #14 and above and below the abovesaid scanning lines are encoded by the RAC method referring to information of the scanning lines #3, #8, #13, ..., respectively. Further, the scanning lines #1 and #5, #6 and #10, #11 and #15, ... above and below the scanning lines #2 and #4, #7 and #9, #12 and #14, ... are encoded by the RAC method using information of the latter scanning lines as reference information, respectively. In practice, the scanning lines are encoded in the following order for transmission.

(#3), #2 (#3), #1 (#2), #4 (#3), #5 (#4), (#8), #7 (#8), #6 (#7), #9 (#8), #10 (#9), ...

The scanning lines indicated by circles are encoded by the RLC method and the other scanning lines are encoded by the RAC method referring to the scanning lines put in the parantheses, respectively.

For example, in a case of k=4 (an even number), as shown in FIG. 2B, the scanning lines #2, #6, #10, ... are encoded by the RLC method and the scanning lines #1 and #3, #5 and #7, #9 and #11, ... above and below the abovesaid scanning lines are encoded by the RAC method referring to the scanning lines #2, #6, #10, ..., respectively. The other remaining scanning lines #4, #8, #12, ... are encoded by the RAC method referring to the scanning lines #3, #7, #11, ..., respectively. In concrete terms, the scanning lines are encoded in the following order for transmission.

(#2), #1 (#2), #3 (#2), #4 (#3), (#6), #5 (#6), #7 (#6), #8 (#7), (#10), #9 (#10), #11 (#10), ...

In other words, with the system of this invention, a facsimile signal is divided into groups each into groups each including k lines, and the central line in each group in a case of k being odd and a line just above or below the central line in a case of k being even are encoded by the coding method which does not use the information of the adjoining scanning lines (for instance, the RLC method) and the remaining scanning lines are sequentially encoded, for example, by the RAC method referring to the information of the adjoining scanning lines (i.e. just precedently encoded lines) in upward and downward directions. Letting the number of the scanning lines encoded by the RLC method be represented by #j, j is given as follows:

$$j = \begin{cases} \dfrac{(k+1)}{2} & \text{in the case of } k \text{ being odd} \\ \dfrac{K}{2} \text{ or } (\dfrac{k}{2}) + 1 & \text{in the case of } k \text{ being even} \end{cases}$$

Thus, according to this invention, assuming that the transmission error occurs on the facsimile signal of the k scanning line entirely at random, the expected value S of the number of scanning lines to be affected by the error is given as follow:

(1) When k is odd, $$S = 1 + (k^2 - 1)/4k$$

(2) When k is even, $$S = (k/4) + 1$$

FIG. 3 is a graph showing the results of comparison in the number of scanning lines affected by the error between the conventional system described previously in respect of FIG. 1 and the system of this invention described above with regard to FIGS. 2A and 2B. The graph indicates that, in this invention, when k is large, the area subject to the influence of the error is reduced substantially by half as compared with that in the case of the conventional system.

FIG. 4 shows examples of the coding sequence and the coding methods of the respective lines, FIG. 4A showing a case of k being 5 and FIG. 4B a case of k being 4. On the transmitting side, facsimile signals to be stored in a reference line memory and a memory for the scanning line to be encoded, which are provided in an encoder of the conventional system, that is, the RAC system, are encoded in such an order shown in FIG. 4. On the receiving side, facsimile signals to be stored in a reference memory and a memory for the scanning line to be decoded, which are provided in a decoder of the conventional system, are decoded in such an order as shown in FIG. 4.

The method of encoding and scanning line using the information of the immediately preceding scanning line as the reference information includes, in addition to the RAC method, (1) a two-dimensional predictive coding method which predicts picture element information of the scanning lines to be encoded using the information of the picture elements of the immediately preceding scanning lines as the reference information and sequentially encodes the addresses of mispredicted picture elements, (2) a method which forms a signal series of each scanning line, representing picture elements of information different from and identical with those of the picture elements just above them by "1" and "0", respectively, and sequentially encodes the run-lengths of the picture elements "0" and "1", and (3) a run-length coding method which predicts the lengths of the runs to be encoded on the basis of the run-length information just above and sequentially encodes errors between the predicted value and the actual one. However, the following description will be given in connection with the RAC method.

FIG. 5 is a block diagram schematically illustrating an example of this invention. In FIG. 5, reference numeral 1 indicates a FAX scanning reader; 2 designates a line sequence changer; 3 indentifies a coder of the conventional system; 4 denotes a decoder which is substantially identical with that employed in the conventional system; 5 represents a line sequence changer; and 6 shows a FAX scanning recorder. The illustrated system is different from the conventional system in the provision of the parts 2 and 5 for changing the sequence of facsimile signals in both of transmission and reception and in writing in a reference line memory of the decoder 4.

FIG. 6 shown in detail an example of the line sequence change 2 in FIG. 5 in a case of k=5. In FIG. 5, reference numeral 11 indicates a terminal which receives a facsimile signal from the FAX scanning reader 1 in FIG. 5; 12 designates a memory having a capacity of five scanning lines to store the facsimile signal applied from the input terminal 11; 13 to 20 identify gates; 21 and 22 denote OR circuits, 23 represents an output terminal for sending out the facsimile signal to a memory, included in the coder 3 in FIG. 5 for storing information of the scanning lines to be encoded; 24 shows an output terminal for sending out the facsimile signal to a reference line memory in the coder 3; 25 refers to a pulse generator for generating gating pulses for the gates 13 to 20 in the order *3-*4-*5-*2-*1; and 26 indicates an OR circuit.

The operation of the line sequence changer 2 shown in FIG. 6 is as follows:—The facsimile signal received from the input terminal 11 is stored in the memory 12 for k(=5) scanning lines. That is, in the example of FIG. 2A, information pulses of the scanning lines, for instance, #1 to #5 are applied to the memory 12 and when all the information have been sent out to the coder 3 in FIG. 5, information pulses of the next lines #6 to #10 are applied to the memory 12. In the following, the operation will be described in respect of the scanning lines #1 to #5. The information pulses of the five scanning lines stored in the memory 12 are read out therefrom in the order #3-#2-#1-#4-#5, as shown in FIG. 4A, by the gating operations of the gates 13 to 17 which are each controlled by the output pulses from the pulse generator 25, and are applied via the OR circuit 21 and the output terminal 23 to the memory for the lines to be encoded in the coder 3. On the other hand, the information pulses of the lines #2 to #4 shown in FIG. 4A are read out in the order #3-#2-#3-#4 by the gating operations of the gates 18, 19 and 20, and are applied via the OR circuit 22 and the output terminal 24 to the reference memory of the coder 3. By the above operations, the information pulses of the scanning lines are stored in the memories for the lines to be encoded and for the reference lines in the coder 3 in the order shown in FIG. 4A, respectively. The scanning line 3 is encoded by the RLC method, the scanning line 2 is encoded by the RAC method using the information of the scanning line 3 as the reference line, and the scanning lines 1, 4 and 5 are similarly encoded by the RAC method using the scanning lines 2, 3 and 4 as the reference lines, respectively.

Figure 7:
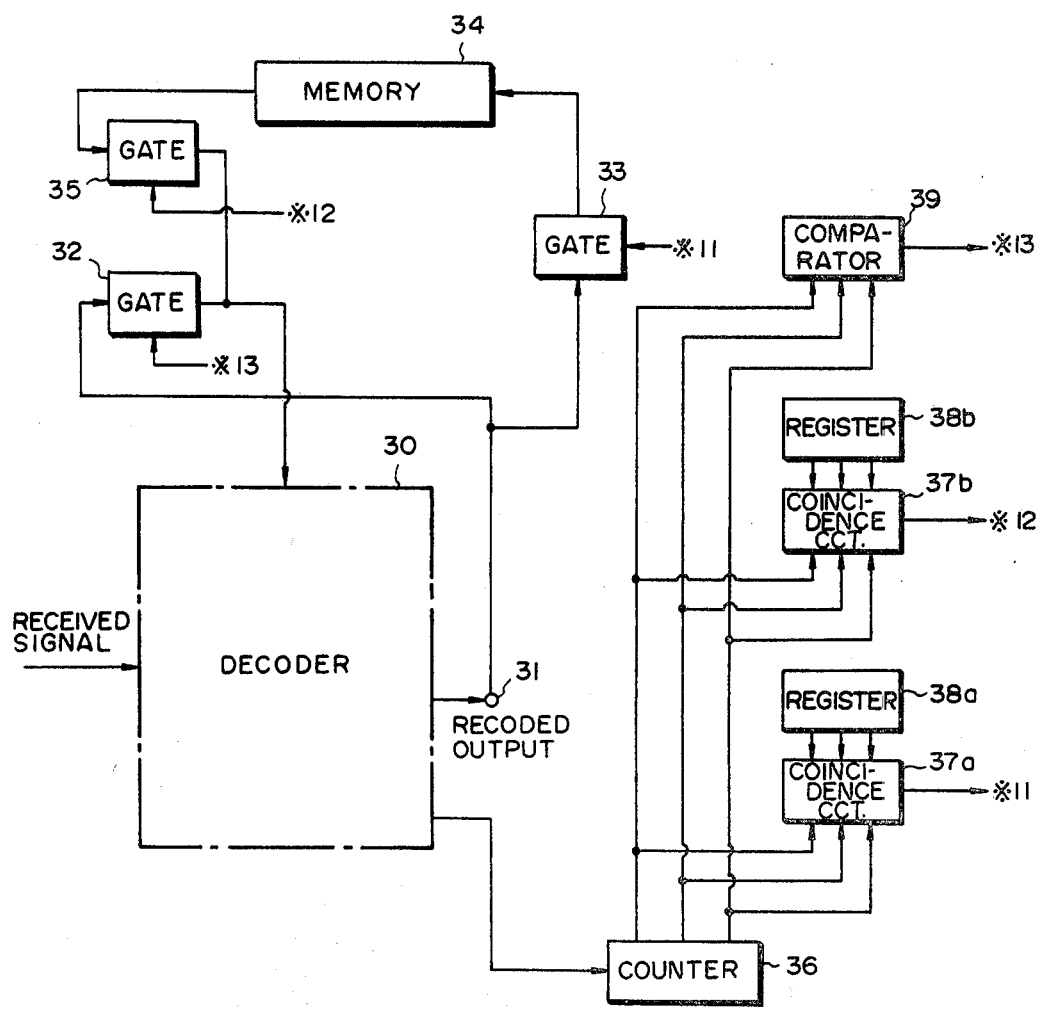

FIG. 7 is a block diagram showing detail an example of the construction of the decoder 4 in FIG. 5. For the sake of simplicity, there is shown a circuit for writing in the reference line memory in which the decoder 4 is different from that of the prior art. In FIG. 7, reference numeral 30 indicates a conventional decoder (Strictly speaking, this circuit structure is that one part is removed from the conventional decoder, as will be described later on); 31 designates an output terminal for providing the output from the decoder 30, that is, the original facsimile signal; 32, 33 and 35 identify gates; 34 denotes a memory for storing a facsimile signal of one scanning line; 36 represents a counter; 37a and 37b show coincidence circuits each of which produces a pulse when two 3-bit inputs thereto coincide with each other; 38a and 38b refer to registers; and 39 indicates a comparator which generates a pulse when the input value thereto is larger than a certain value "1".

The decoder 4 shown in FIG. 7 performs the following operation but the outline thereof will be described first in comparison with a circuit heretofore employed. In the conventional system, since the reference line for a certain line to be decoded is always the decoded immediately before, the input to the reference line memory in the decoder 30 is the decoded output from the output terminal 31. In the system of this invention, however, the reference line for a certain line to be decoded is not always the scanning line decoded immediately before, as shown in FIG. 4A. As is seen from FIG. 4A, when k=5, the scanning line #3 is encoded by the RLC method, and hence has no reference line and the reference lines for the scanning lines #2, #1 and #5 are the scanning lines #3, #2 and #4 decoded immediately before them, respectively, but the reference line for the scanning line #4 is the scanning line #3 decoded first.

Next, the operation of the circuit depicted in FIG. 7 will be described. A description will be given first in conjunction with the gating operations of the gates 32, 33 and 35. These gates are controlled by the output pulses from the comparator 39 and the coincidence circuits 37a and 37b, respectively. The control pulses are determined to be provided or not to be produced in accordance with the value of the counter 36 which receives a line synchronizing signal (pulses each produced upon each completion of decoding of one scanning line) from the conventional decoder 30. The counter 36 counts 1 to k (k=5 in the present example) and the registers 38a and 38b have stored therein fixed values 1 and j(j=3 in this exmple), respectively, Since the counter 36 receives the line synchronizing signal from the decoder 30, the count value of the counter indicates the line sequence of 1 to k (=5). Accordingly, the output *11 from the coincidence circuit 37a is turned ON to enable the gate 33 when the count value of the counter 36 is "1", that is, when the first line signal (#3) of the k scanning lines has been decoded by the decoder 30. In a similar manner, the output *12 from the coincidence circuit 37b is turned ON to enable the gate 35 when the count value of the counter 36 is j (=3), that is, the jth line signal (#1) of the k scanning lines has been decoded by the decoder 30. The comparator 39 turns ON the output *13 thereof to enable the gate 32 when the count value fo the counter 36 is larger than "1", that is, when a signal other than the first line signal (#3) of the k scanning lines has been decoded. Before the first line signal (#j) of the k scanning lines (in the present example, k=5 and j=3) is decoded, the gates 32, 33 and 35 are also closed, so that no input is provided to the reference line memory of the decoder 30 but, upon completion of decoding of the information of the line (#j), the decoded output is provided at the output terminal 31 and written via the gates 32 and 33 in both of the reference line memory of the decoder 30 and the memory 34. Namely, in the decoding of the information of the next scanning line (#j−1), the scanning line #j is used as the reference line. Upon completion of the decoding of the scanning line #j−1, only the gate 32 is opened, through which the decoded output (the scanning line #j−1) is written in the reference line memory of the decoder 30 and is used as the reference line in the decoding of the next scanning line (#j−2). When such an operation has been repeated (j−2) times to complete the decoding of the scanning line #1, the gates 32 and 33 remain closed but only the gate 35 is opened, writing the content of the memory 34, that is, the information of the scanning line #j in the reference line memory of the decoder 30. Therefore, in the decoding of the next scanning line (#j+1), the scanning line #j is used as the reference line. Upon completion of the decoding of the scanning line (#j+1), only the gate 32 is opened, through which the information of the scanning line (#j+1) is written in the reference line memory of the decoder 30 and is used as the reference line in the decoding of the next scanning line (#j+2). When such an operation has been repeated k−(j+1) times to complete the decoding of the information of the scanning line #k, decoding of the information of the k scanning lines is finished.

FIG. 8 is a block diagram illustrating in detail an example of the construction of the line sequence changer 5 utilized in FIG. 5. In FIG. 8, reference numeral 41 indicates an input terminal to which is applied the decoded fascimile signal derived from the output terminal 31 in FIG. 7; 42 designates a memory having a capacity of k (=5) scanning lines; 43 to 47 identify gates; 48 denotes an OR circuit; and 49 represents an output terminal. The operation of the line sequence changer 5 shown in FIG. 8 is as follows:

The memory 42 stores the decoded output obtained the decoder 4 in FIG. 7, so that, in the example of FIG. 4A, the information of the respective scanning lines are stored in the abovesaid memory in the order #3-#2-#1-#4-#5, as depicted in FIG. 8. The information of these five scanning lines are outputted in the order #1-#2-#3-#4-#5 through the OR circuit 48 and the output terminal 49 since the gates 43 to 47 which perform the same gating operations as the gates 13 to 17 in FIG. 6 are opened in the order 45-46-47-44-43.

The above description has been given in connection with the system described previously in respect of FIG. 2 but it is also possible to modify the system of FIG. 2 to such a system as shown in FIG. 9. FIG. 9 shows an example of k=9 and the scanning lines are encoded in the following sequence:

At first, the central one of the nine scanning lines, that is, the scanning line #5 is encoded by the RLC method and then the scanning line #4 just above the scanning line #5 is encoded by the RAC method using the scanning line #5 as the reference line. This is the same as the method described with reference to FIG. 2A and 2B. Next, the scanning line #3 is not encoded but instead the scanning line #2 is encoded by the RAC method using the scanning line #4 (or #5) as the reference line. Thereafter the scanning lines #1 and #3 are each encoded by the RAC methods using the scanning line #2 as the reference line. In a likewise manner, when the lines below the scanning line #5 are encoded, the scanning line #6 is at first encoded by the RAC method using the scanning line #5 as the reference line, after which the line #8 is encoded by the RAC method using the scanning line #6 (or #5) as the reference line. Finally, the scanning lines #7 and #9 are each encoded by the RAC method using the scanning line #8 as the reference line. In a case where the scanning lines #2 and #8 are encoded prior to the encoding of the scanning lines #3 and #7, respectively, as mentioned above, the reference line for each preceding scanning line is spaced therefrom by one scanning line, so that the reduction ratio of the encoded scanning line is a little lowered but the area which is affected by the error becomes narrow to provide for enhanced received picture quality.

As described in detail above, with the present invention, it is possible to reduce the number of scanning lines or area subject to the influence of the error by changing the sequence of scanning lines to be encoded with the additional provision of a memory having a capacity of several scanning lines and associated circuits in the conventional system in which the information of respective scanning lines of a facsimile signal are sequentially encoded on the basis of the immmediately preceding scanning lines.

What we claim is:

1. A facsimile signal coding system comprising:
   input terminal means for receiving a facsimile signal to be coded;
   group means connected to said input terminal means for dividing said input facsimile signal into a plurality of scanning groups each including a number of scanning lines;
   coding means connected to said group means for coding each of said scanning line groups, so that a substantially central one of the scanning lines of each group is encoded by a coding method without referring to information of a scanning line adjacent to the central scanning line, so that information of the remaining lines above the central scanning line is sequentially encoded upwardly from the central scanning line using information of the just precedently encoded line as reference information for each scanning line to be coded, and so that information of the remaining lines below the central scanning line is sequentially encoded downwardly from the central scanning line using information of the just precedently encoded line as reference information for each scanning line to be coded; and
   output terminal means connected to said coding means for obtaining the coded output of said facsimile signal.

2. A facsimile signal coding system according to claim 1, in which said just precedently encoded lines are arranged one after another above and below the central line.

3. A facsimile signal coding system according to claim 1, in which said just precedently encoded lines are arranged in predetermined orders at least either above or below the central line.

* * * * *